Dec. 18, 1962 E. VAN LIEW 3,069,573

CONNECTOR ASSEMBLY FOR ANNULAR PIEZOELECTRIC TRANSDUCERS

Filed June 26, 1961

INVENTOR.
EUGENE VAN LIEW

BY Howard J. Murray Jr. AGENT

George J. Rubens ATTORNEY

United States Patent Office 3,069,573
Patented Dec. 18, 1962

3,069,573

CONNECTOR ASSEMBLY FOR ANNULAR PIEZOELECTRIC TRANSDUCERS

Eugene Van Liew, Canoga Park, Calif., assignor, by mesne assignments, to the United States of America as represented by the Secretary of the Navy Filed June 26, 1961, Ser. No. 119,753
4 Claims. (Cl. 310—9.1)

The present invention relates in general to piezoelectric transducers, and more particularly to an assembly for making electrical connections to the active element of such a device.

One known form of piezoelectric transducer incorporates an annular body composed of material which has the property of changing its dimensions in response to variations in electrical energy applied thereto. An example of such a material is barium titanate in ceramic form, which, when configured as a ring or annulus, may be caused to vibrate radially at a frequency determined by the physical dimensions of the ring and by the characteristics of the constituent material. Transducers of this type are frequently employed to produce compressional waves in fluids in response to the reception thereby of electrical variations, or, vice versa, to develop electrical oscillations in response to changes in their physical environment.

It is recognized in the art that piezoelectric ceramic materials are often superior as electromechanical resonators and transducers to crystals of pure quartz. Although the latter have excellent properties as far as stability and mechanical strength are concerned, they nevertheless possess a relatively narrow frequency bandwidth. Consequently, ceramic materials in disc or ring form are often utilized, since they can be made to occupy a very small space and hence are extremely well suited for use in equipment calling for miniaturized components. It will be understood, however, that the present invention is applicable to many different types of ferroelectric materials in addition to base ceramics such as barium titanate, other examples being the titanates of the alkaline earth metals, bismuth oxides, boron iodides, etc. It is only necessary that the material employed for the active element of the transducer become piezoelectric after proper polarization, or initially possess this property.

It is also known that diverse modes of vibration may be induced in certain ceramics by suitably prepolarizing them in different directions. For example, a thin disc is particularly well suited for use as an electric resonator because of its excellent characteristics in the radial mode of vibration. Similar characteristics are exhibited by an element of annular or ring-shaped design, and it is with this latter configuration that the present invention is concerned.

A ring-shaped body of polycrystalline ferroelectric material such as barium titanate may have imparted thereto predetermined electromechanical properties by providing it with a plurality of circumferentially-spaced electrodes which, when selectively energized, develop an electric field extending circumferentially in the direction of major expansion and contraction of the ceramic. One especially useful arrangement of this nature incorporates a plurality of so-called "stripe" electrodes spaced apart circumferentially around the periphery of the ceramic ring, with a set of alternate electrodes being connected to one terminal of an electrical circuit and the intermediate electrodes forming another set which are connected to the remaining circuit terminal. When proper potentials are applied to these two sets of electrodes, the piezoelectric element is caused to enter a state of vibration the direction of which is essentially radial with respect to its axis. Expressed differently, each application of a suitable potential to the ceramic body shocks the latter into radial vibration at a given frequency.

In order to produce this result, the same potential must be applied concurrently to alternate ones of the circumferentially-spaced electrodes surrounding the ceramic ring, thus necessitating a direct electrical connection between such individual electrodes and one terminal of the input circuit. Heretofore, all of the electrodes in each set have been connected together by individually-soldered wires, with each such wire looping or "jumping" over the intermediate electrodes of the other set. This required a large number of individual soldering operations, and, furthermore, the continual radial vibration of the ceramic element subjected these soldered connections to considerable stress, frequently resulting in their premature failure with consequent harmful effects upon the output of the assembly. In addition, the mass of these wire connectors taken in the aggregate was not inconsiderable, so that the inertia of this mass was a factor which the device had to overcome, thereby lowering its output efficiency to a noticeable degree.

In accordance with one feature of the present invention, there is provided an electrode connector assembly for ring-shaped piezoelectric elements of the type under discussion, this connector assembly consisting essentially of two spider elements composed of spring metal or other resilient electrically-conductive material, these elements being supported in face-to-face relationship on a common insulating base positioned centrally within the ceramic ring, and with the legs of the respective spider elements extending radially outwardly to a position alongside the circumferentially-spaced electrodes with which they are to be associated. The number of legs on each spider element is chosen to be equal to the number of electrodes in one set, so that electrical contact is made between one spider element and one set of electrodes on one side of the ceramic ring, and similar contact is made between the second spider element and the remaining set of elements on the other side of the ceramic ring. Each spider element, of course, is connected to one of the terminals from which energy is supplied to the assembly. Such a design eliminates the difficulties encountered in prior arrangements with wherein individually-soldered "jumpers" are employed, since, as will subsequently be brought out, the portion of that leg of a spider to which any individual electrode is connected is, in effect, spring-mounted, and thus the "damping" effect of conventional wiring is almost completely absent during operation of the device. The output efficiency of the apparatus is consequently increased to a considerable degree.

One object of the present invention, therefore, is to provide an improved form of connector assembly for electrically joining together selected electrodes of a ring-shaped piezoelectric element in cases where these electrodes are spaced apart circumferentially around the periphery of such element.

A further object of the invention is to provide means for electrically connecting together one set of alternate electrodes of a transducer such as herein described without the necessity of employing individually-soldered wires arranged to "jump," or loop over, the intermediate electrodes which constitute the other set.

A still further object of the invention is to provide a connector assembly, of the type herein described, in which the individual contacts to the electrodes carried by the transducer piezoelectric element are spring-mounted so as to be set into free oscillation by a radial vibration of the such element, the spring mounting of these contacts acting to reduce the inertia of the connector assembly below that of other connector units possessing a high damping factor due to the "dead weight" of looping wires or "jumpers."

Other objects and many of the attendant advantages of this invention will be readily appreciated as the same becomes better understood by reference to the following detailed description when considered in connection with the accompanying drawing wherein.

Figure 1:
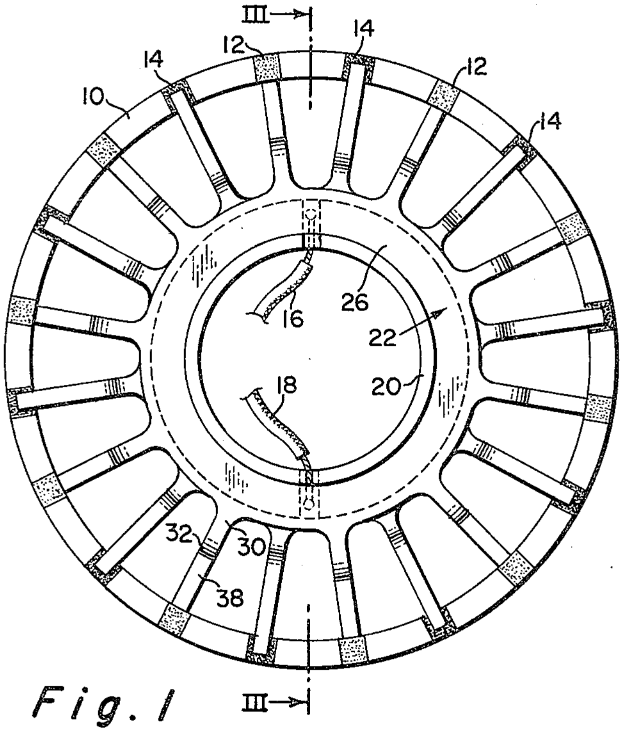
FIG. 1 is an end view of a connector assembly designed in accordance with a preferred embodiment of the present invention, this connector assembly being shown in conjunction with a ring-shaped piezoelectric element having a plurality of circumferentially-spaced electrodes carried thereon.
Figure 2:
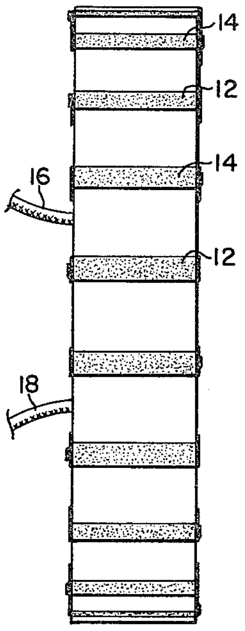
FIG. 2 is a side view of the electrode structure of FIG. 1.

Referring now to the drawing, there is shown a transducer incorporating a piezoelectric element 10 of annular or ring-shaped configuration and preferably composed of some suitable ceramic material such, for example, as barium titanate or barium titanate mixed with other titanates. However, the particular composition of this piezoelectric element 10 forms no part of the invention, and the mentioned materials are given merely as preferred examples. The ring 10, hereinafter designated illustratively as being of a ceramic nature, is provided with a plurality of so-called "stripe" electrodes which are circumferentially-spaced around the periphery thereof, each of these electrodes being formed of some electrically-conducting material (for example, silver or platinum) which is applied to the surface of the ceramic ring in any suitable fashion such as by electrodeposition. This electrically-conducting coating may be attained by covering a portion of the ceramic surface with a silver paint and then firing the latter to produce a coating of metallic silver which is fused to the ceramic and is of extreme thinness. A structure which has been found to be unusually efficient in actual operation includes a ceramic ring having an inner diameter of 2.4 inches and an outer diameter of 2.6 inches, the axial length of the ring being .7 inch. Circumferentially disposed upon the ring 10 are twenty electrodes grouped into one set of ten alternate electrodes (this electrode set being designated in the drawing by the reference numeral 12) and a second set 14 also of ten alternate electrodes interposed between the electrodes of the first set. In order that the transducer operate for the purpose intended, it is desired that the set of electrodes 12 be electrically connected to one output conductor 16 and that all of the electrodes 14 be connected to another output conductor 18. It might be mentioned that each of the electrodes 12 and 14, in the example given, possesses a width of 1/16 of an inch (circumferentially of the ceramic ring 10) and extends over a portion of the inner, outer and both end surfaces of the ring.

It has been stated that all of the electrodes 12 are to be connected to one output conductor 16, and that all of the electrodes 14 are to be connected to the other output conductor 18. The structure for effecting these connections includes an annular base 20 formed of some suitable insulating material and disposed coaxially within the piezoelectric ring 10. This base 20 supports thereon two spider elements generally identified by the reference numerals 22 and 24, respectively. As perhaps best shown in FIG. 3, these spider elements 22 and 24 are arranged in face-to-face relation so that the central hub portion 26 of the spider element 22 is supported on a shoulder 27 formed on one side of the insulating base 20, while the central hub portion 28 of the spider element 24 is supported on a shoulder 29 formed on the opposite side of the base. As also best shown in FIG. 3, the hub portion 26 of the spider 22 is electrically connected to the output conductor 16, while the hub portion 28 of the spider 24 is similarly electrically connected to the output conductor 18.

Radiating from the central hub portion 26 of spider 22 are a plurality of legs the outer ends of which extend alongside and are respectively soldered to the electrodes 12. In similar fashion, the spider 24 is formed with a plurality of radiating legs the outer ends of which extend alongside and are respectively soldered to the electrodes 14. It will be noted in passing that the spider elements 22 and 24 are identical in design, and hence interchangeable during assembly of the transducer unit.

Figure 3:
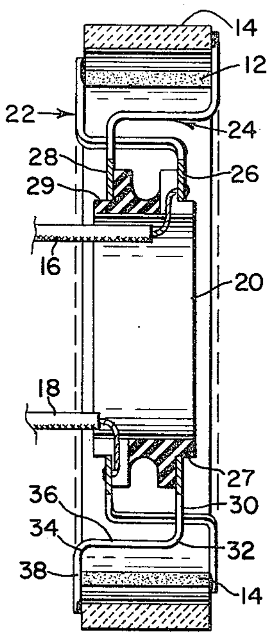
FIG. 3 is a sectional view of FIG. 1 taken along the line III—III.

As brought out particularly in FIG. 3 of the drawing, each of the spider elements 22 and 24 is arranged so that the individual legs thereof extend radially outwardly for an initial portion of their length (the initial portion of a representative leg of the spider element 22, for example, which extends radially outwardly from the central hub portion 26 being designated in FIG. 3 by the reference numeral 30) to a point 32 where the leg bends at an angle of essentially 90° to the plane of the hub 26, and then extends axially or longitudinally to a point 34 where the leg undergoes another right-angle bend to again extend radially outwardly. In the drawing, the axially-disposed portion of the representative leg is identified by the reference numeral 36, while the outermost radially-extending portion is identified by the reference numeral 38. Expressed in different language, each leg of the spider element 22 (for example) which extends outwardly from the central hub portion 26 has two right-angle bends therein, so that each leg is made up of (1) a first straight portion 30 extending radially from the hub 26, (2) an intermediate portion 36 extending axially past the other spider member 24, as shown in FIG. 3, and (3) a third portion 38 extending radially outwardly alongside the ceramic ring 10. Each of the spider elements 22 and 24 is preferably composed of some spring material such as beryllium copper, which not only possesses good electrical conductivity, but is also resilient and capable of undergoing a slight amount of positional displacement when the assembly is initially arranged prior to the soldering or other operation by which the individual spider legs are fixedly secured to the electrodes 12 and 14.

It will now be appreciated that, in assemblying the device of the present invention, the insulating base 20 is positioned so that it is coaxial with the ceramic ring 10 or, in other words, so these two members are disposed in the manner illustrated in FIG. 3 of the drawing. One spider element (such as 22) is then fitted upon shoulder 27 of the base so that its radially extending legs lie against the sides of the electrodes 14 with which the legs are to be associated. The spider 22 is secured in place on shoulder 27 by any suitable means (not shown) and an electrical connection is made to the output conductor 16 in any preferred manner.

The remaining spider element 24 is now brought into position alongside the opposite face of the base 20 so that it is supported by the shoulder 29. Each of the radially-extending legs of the spider 24 is thus placed in physical contact with the side of the respective electrode 12 with which it is associated. Inasmuch as the legs of the spider elements 22 and 24 contact the ceramic ring 10 on opposite sides thereof, alternate ones of the "stripe" electrodes are electrically joined together in the manner desired.

When the two spider elements 22 and 24 are in place so that the legs thereof contact their respective electrodes, the outer extremities of each of the legs is placed under a slight amount of tension due to the spring construction of these elements, and this force acts to hold the legs in their proper position with respect to the ceramic ring 10. In other words, because of the slight deflection of the legs of the spiders which is required to position the outer portions of the legs against the electrodes, each such leg exerts a minute force against the edge of the electrode with which it is in contact, so that the entire assembly as illustrated in the drawing is self-supporting prior to the soldering operation. The latter process is thus facilitated, since no jig or other external support is necessary.

It should be noted that when the transducer is in operation, a failure of one of the soldered connections between a leg and an electrode will not seriously lower the efficiency of the assembly, since the continued pressure of the leg upon the electrode will maintain electrical contact between these elements even though the soldered joint is broken or loosened.

The operating efficiency of the disclosed assembly is quite high as compared to that of piezoelectric transducers in which alternate electrodes on the polarized element are electrically joined by means of looping wires or "jumpers." In such known devices, these wires together constitute a mass which possesses inertia and which must be repeatedly displaced in position during vibration of the transducer assembly. The energy utilized to bring about this displacement results in a reduction in useful output from the device. However, with applicant's spring-mounted contacts for electrically connecting the individual electrodes to an output circuit, it is possible to achieve a marked reduction in the damping effect produced by conventional wiring. This is due largely to the manner in which each of the spider legs is configured between the point where it extends from the hub portion of the spider, on one hand, to that point where it electrically contacts the transducer electrode, on the other. Since the mid-section of each spider leg extends axially between a pair of right-angle bends, it will be appreciated that any radial vibration of the piezoelectric ring will produce a simple flexing of the leg at these bends, rather than placing the entire leg under tension and compression as would be the case with a contact extending directly outwardly in an essentially linear fashion from a central region to the periphery of the ceramic ring. The over-all result is that much less resistance to the vibratory action of the ceramic ring is offered by the structure herein disclosed than is obtainable from other methods of making contact in devices of the same general nature.

Other advantages accruing from applicant's particular design include a reduction in the time necessary for manufacture of the unit, since the individual legs of each contact group are positioned at one time merely by properly mounting the two spiders on their supporting base. Still further, the unit is more rugged and trouble-free than conventional wiring, and, due to its ease of manufacture, yields considerable economies when fabricated on a mass-production basis.

Obviously many modifications and variations of the present invention are possible in the light of the above teachings. It is therefore to be understood that within the scope of the appended claims the invention may be practiced otherwise than as specifically described.

I claim:

1. A transducer comprising a ring-shaped element of piezoelectric material having an inner surface, an outer surface, and two end surfaces considered radially with respect thereto, said piezoelectric element being capable of vibrating radially; a plurality of electrodes in the form of bands of electrically-conductive material disposed upon the surface of said piezoelectro element and circumferentially-spaced around the periphery thereof, each electrode extending axially along the outer surface of the piezoelectric element, radially along one end surface thereof, axially along the inner surface of the element, and then again radially along the remaining end surface thereof so as to define a continuous loop; a generally tubular base of electrically-insulating material disposed within said ring-shaped piezoelectric element and positioned coaxially with respect thereto; a pair of electrical contacting units composed of resilient material and configured in the form of spiders each having a central hub portion and a plurality of radially-extending legs equal in number to one-half the number of electrodes disposed upon the surface of said piezoelectric element, the two said contacting units being supported on said base and positioned face-to-face in spaced-apart relation axially of said base so that corresponding legs of the two spiders are angularly off-set from one another considered circumferentially of said piezoelectric element by an amount equal to the circumferential spacing between adjacent ones of said electrodes, each leg of each of the two said spider elements having an initial portion extending radially outwardly from said hub, an intermediate portion extending axially of said assembly, and a terminal portion again extending radially outwardly to a point where it contacts an end surface of one of the electrodes disposed upon said piezoelectric element; means for rigidly securing the respective legs of each spider to alternate ones of said electrodes, the legs of one of the spiders being thus secured to their respective electrodes on end surfaces of such electrodes opposite in an axial sense to the electrode end surfaces to which the legs of the remaining spider are secured; and a terminal connection from each spider to an output conductor.

2. A transducer according to claim 1, in which said insulating base is provided with a pair of axially-spaced-apart shoulders around the periphery thereof, said pair of spiders being respectively carried on said shoulders so that the respective hub portions of the spiders lie in planes which are essentially parallel to one another and normal to the longitudinal axis of the transducer.

3. A transducer according to claim 1, in which said spiders are composed of spring metal, whereby, upon a radial vibration of said piezoelectric element during operation of said transducer, each leg of each spider element will undergo a flexing intermediate its terminal portions, such flexing, due to the resilient nature of the material of which said spring metal legs are composed, possessing an oscillatory mode conforming to the mode of radial vibration of said piezoelectric element, so that the energy otherwise required to be supplied by said transducer in order to radially displace the outer terminal portions of the legs of the two spiders during radial vibration of said piezoelectric element is reduced by an amount representing a portion of the energy stored in each spring metal leg when the latter is flexed during the initial portion of each vibratory cycle.

4. A transducer according to claim 3, in which the spring metal constituting each of said spiders is beryllium copper.

No references cited.